US011956259B2

(12) United States Patent
Moreno et al.

(10) Patent No.: US 11,956,259 B2
(45) Date of Patent: *Apr. 9, 2024

(54) SYSTEMS AND METHODS FOR SIDE-CHANNEL MONITORING OF A LOCAL NETWORK

(71) Applicant: Palitronica Inc., Kitchener (CA)

(72) Inventors: Carlos Moreno, Waterloo (CA); Sebastian Fischmeister, Waterloo (CA)

(73) Assignee: Palitronica Inc., Kitchener (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,200

(22) Filed: Feb. 10, 2023

(65) Prior Publication Data

US 2023/0300154 A1  Sep. 21, 2023

Related U.S. Application Data

(63) Continuation of application No. 16/931,008, filed on Jul. 16, 2020, now Pat. No. 11,588,831, which is a
(Continued)

(51) Int. Cl.
*H04L 29/06* (2006.01)
*G06F 21/44* (2013.01)
(Continued)

(52) U.S. Cl.
CPC .......... *H04L 63/1416* (2013.01); *G06F 21/44* (2013.01); *H04L 63/0876* (2013.01);
(Continued)

(58) Field of Classification Search
CPC .............. H04L 63/1416; H04L 63/123; H04L 63/0876; G06F 21/44
See application file for complete search history.

(56) References Cited

U.S. PATENT DOCUMENTS 9,268,938 B1 * 2/2016 Aguayo Gonzalez ...................... G01R 31/2832
11,588,831 B2   2/2023 Moreno et al.
(Continued)

OTHER PUBLICATIONS

Checkoway, S., McCoy, D., Kantor, B., Anderson, D., Shacham, H., Savage, S., Koscher, K., Czeskis, A., Roesner, F. and Kohno, T., Aug. 2011, Comprehensive experimental analyses of automotive attack surfaces. In USENIX Security Symposium (vol. 4, pp. 447-462).

(Continued)

*Primary Examiner* — Vance M Little
(74) *Attorney, Agent, or Firm* — BERESKIN & PARR LLP/S.E.N.C.R.L., s.r.l.

(57) ABSTRACT

Systems and methods for side-channel monitoring a local network are disclosed. The methods involve generating a program trace signal from at least one of power consumption, electromagnetic emission, or acoustic emanation of a control processor connected to the local network and operating a monitoring processor to detect a communication of a message on the local network; identify at least one purported control processor related to the communication; analyze the program trace signal of the at least one purported control processor relative to the communication; and at least one of an authenticate or verify one or more purported control processors of the at least one purported control processor based on the program trace signal of the at least one purported control processor.

22 Claims, 3 Drawing Sheets

Related U.S. Application Data continuation-in-part of application No. 16/874,507, filed on May 14, 2020, now Pat. No. 11,632,313.

(60) Provisional application No. 62/847,441, filed on May 14, 2019.

(51) Int. Cl.
  *H04L 9/40* (2022.01)
  *G06N 5/04* (2023.01)
  *G06N 20/00* (2019.01)
  *H04L 12/40* (2006.01)

(52) U.S. Cl.
  CPC .............. *H04L 63/123* (2013.01); *G06N 5/04* (2013.01); *G06N 20/00* (2019.01); *H04L 2012/40215* (2013.01)

(56) References Cited

U.S. PATENT DOCUMENTS

| | | | |
|---|---|---|---|
| 11,632,313 | B2 | 4/2023 | Moreno et al. |
| 2010/0100964 | A1* | 4/2010 | Mahaffey ............. G06F 21/577 726/25 |
| 2016/0327596 | A1* | 11/2016 | Salajegheh .......... G01R 31/002 |
| 2019/0253439 | A1* | 8/2019 | Payton ................ H04W 12/122 |

OTHER PUBLICATIONS

Cho, K.T. and Shin, K.G., 2016. Fingerprinting electronic control units for vehicle intrusion detection. In 25th {USENDC} Security Symposium ({USENIX} Security 16) (pp. 911-927).

Cho, K.T. and Shin, K.G., Oct. 2017, Viden: Attacker identification on in-vehicle networks. In Proceedings of the 2017 ACM SIGSAC Conference on Computer and Communications Security (pp. 1109-1123).

Groza, B., Murvay, S., Herrewege, A.V. and Verbauwhede, I., 2017. Libra-can: Lightweight broadcast authentication for controller area networks. ACM Transactions on Embedded Computing Systems (TECS), 16(3) (pp. 1-28).

Kneib, M. and Huth, C., Jan. 2018, Scission: Signal characteristic-based sender identification and intrusion detection in automotive networks. In Proceedings of the 2018 ACM SIGSAC Conference on Computerand Communications Security (pp. 787-800).

Koscher, K., Czeslcis, A., Roesner, F., Patel, S., Kohno, T., Checkoway, S., McCoy, D., Kantor, B., Anderson, D., Shacham, H. and Savage, S., May 2010, Experimental security analysis of a modern automobile. In 2010 IEEE Symposium on Security and Privacy (16 pages).

Brown, D.A., Cooper, G., Gilvarry, I., Grawrock, D., Rajan, A., Tatourian, A., Venugopalan, R., Vishik, C., Wheeler, D., Zhao, M. and Clare, D., 2015. Automotive security best practices: recommendations for security and privacy in the era of the next-generation car. White Paper, McAfee Inc, 62 (23 pages).

Miller, C. and Valasek, C., 2015. Remote exploitation of an unaltered passenger vehicle. Black Hat USA, 2015 (pp. 1, 5-6, 87-88).

Miller, C. and Valasek, C., 2016. Advanced CAN injection techniques for vehicle networks. YouTube [online] [video]. Presentation at BlackHat USA. [retrieved on May 21, 2020]. Retrieved from </https://www.youtube.com/watch?v=4wgEmN1u20c> (33 pages).

Mukherjee, S., Shirazi, H., Ray, I., Daily, J. and Gamble, R., Dec. 2016, Practical DoS attacks on embedded networks in commercial vehicles. In International Conference on Information Systems Security (pp. 23-42), Springer, Cham.

Murvay, P.S. and Groza, B., 2014. Source identification using signal characteristics in controller area networks. IEEE Signal Processing Letters, 21(4) (4 pages).

Petit, J. and Shladover, S.E., 2014. Potential cyberattacks on automated vehicles. IEEE Transactions on Intelligent transportation systems, 16(2) (10 pages).

Pike, L., Sharp, J., Tullsen, M., Hickey, P.C. and Bielman, J., May 2015, Securing the automobile: A comprehensive approach. In Embedded Security in Cars (ESCAR) Conference (10 pages).

CAN Specification, Version 2.0, Sep. 1991, Robert Bosch GmbH, Stuttgart, Germany (72 pages).

Surface Vehicle Recommended Practice—Cybersecurity Guidebook for Cyber-Physical Vehicle Systems, J3061, Jan. 2016 (pp. 1-6), SAE International.

Sagong, S.U., Ying, X., Clark, A., Bushnell, L. and Poovendran, R., Apr. 2018, Cloaking the clock: emulating clock skew in controller area networks. In 2018 ACM/IEEE 9th International Conference on Cyber-Physical Systems (ICCPS) (pp. 32-42), IEEE.

Van Herrewege, A., Singelee, D. and Verbauwhede, I., Nov. 2011. CANAuth—a simple, backward compatible broadcast authentication protocol for CAN bus. In ECRYPT Workshop on Light¬weight Cryptography (vol. 2011) (7 pages).

Liu, et al., On Code Execution Tracking via Power Side-Channel, ACM 2016 (Year: 2016).

Boggs, Chau and Cui, Utilizing Electromagnetic Emanations for Out-of-Band Detection of Unknown Attack Code in a Programmable Logic Controller, Proceedings of SPIE Defense + Security 2018, Orlando Florida, US. (Year: 2018).

Soll, Korak, et al., EM-Based Detection of Hardware Trojans of FPGAs, IEEE 2014 (Year: 2014).

Moreno et al., On the Security of Safety-critical Embedded Systems: Who Watches the Watchers? Who Reprograms the Watchers?, 3rd Int'l Conf on Information Systems Security and Privacy, 2017 (6 pages).

\* cited by examiner

SYSTEMS AND METHODS FOR SIDE-CHANNEL MONITORING OF A LOCAL NETWORK

CROSS-REFERENCE TO RELATED APPLICATIONS

This application is a continuation of U.S. patent application Ser. No. 16/931,008, filed on Jul. 16, 2020, which is a continuation-in-part of U.S. patent application Ser. No. 16/874,507, filed on May 14, 2020, which claims priority from U.S. Provisional Patent Application No. 62/847,441, filed on May 14, 2019. The entire contents of U.S. patent application Ser. No. 16/931,008, U.S. patent application Ser. No. 16/874,507 and U.S. Provisional Patent Application No. 62/847,441 are hereby incorporated by reference for all purposes.

FIELD

The embodiments described herein relate to the field of embedded computing systems, and in particular, side-channel analysis of embedded computing systems for security, safety, and development.

BACKGROUND

Security and safety can be essential aspects of embedded computing systems, especially safety-critical systems, and in view of the ever-increasing connectivity of such systems. Traditionally, safety-critical systems have used run time monitoring techniques to enforce security and safety properties during operation. However, monitoring security and safety properties poses unique challenges. The functionality of safety-critical systems should not be disrupted by such monitoring. In addition, firmware reprogramming can bypass a monitoring tool if it runs alongside the monitored and vulnerable system. Furthermore, if malware runs on the same processor as the monitoring tool, then malware can "fake" behaviors that the monitoring tool will consider acceptable.

An example of a safety-critical embedded computing system can be found in the automotive space. The typical local communication network in an automotive vehicle is a CAN bus, to which a plurality of electronic control units (ECUs) connected. CAN buses are a fundamentally insecure communication network. However, cybersecurity has not historically been a critical aspect of automotive vehicles nor as widespread in automotive vehicles as it is with other technologies such as electronic devices. This is due to automotive vehicles having had little or no connectivity to the outside world. However, automotive vehicles now include a high level of connectivity. Furthermore, with the prospect of autonomous vehicles, cybersecurity is a critical aspect in modern automotive vehicles.

Existing methods of addressing cybersecurity in automotive vehicles include the use of cryptography to authenticate a sender. However, such methods can have limited applicability due to the broadcast nature and relatively low bandwidth of CAN buses. Furthermore, automotive vehicles often include commercial off-the-shelf (COTS) devices because they are readily available. However, COTS devices are generally heterogeneous. As such, it can be difficult to set up and share common secrets between devices on the CAN bus for symmetric-key cryptographic primitives.

Some other methods to address cybersecurity in automotive vehicles involve fingerprinting some physical characteristic(s) of the transmitting device. For example, timing-based detection of impersonating devices have been proposed. However, such methods can be vulnerable to profile-and-mimic attacks in which timing characteristics are fingerprinted and emulated by an attacker. Some other proposed methods involve voltage-based sender identification techniques. However, such methods can also be vulnerable to profile-and-mimic attacks because an attacker with temporary physical access to the CAN bus could place a transmitter having a custom-made analog CAN driver on the CAN bus to inject an arbitrary waveform on the CAN bus. This is particularly plausible since the proposed voltage-based sender identification techniques do not use the complete analog waveform of communications, but instead they extract some statistical characteristics of the voltage, making it easier to emulate by an attacker.

SUMMARY

The various embodiments described herein generally relate to side-channel monitoring systems and methods of operating thereof. The disclosed methods and systems can relate to authenticating and verifying embedded computing systems.

In accordance with an example embodiment, a system for side-channel monitoring of a local network having a plurality of control processors connected thereto is provided. The system includes a detector for each control processor; a communication component to provide access to the local network; and a monitoring processor in communication with the communication component and each detector. The detectors are operable to generate a program trace signal from at least one of power consumption, electromagnetic emission, or acoustic emanation of the respective control processor. The monitoring processor is operable to detect a communication of a message on the local network; identify at least one purported control processor related to the communication; analyze the program trace signal of the at least one purported control processor relative to the communication; and at least one of authenticate or verify the one or more purported control processors of the at least one purported control processor based on the program trace signal of the at least one purported control processor.

In some embodiments, the at least one purported control processor can include a purported transmitter of the message; and the monitoring processor can be operable to authenticate the purported transmitter of the message.

In some embodiments, the monitoring processor can be operable to analyze the program trace signal of each control processor of the plurality of control processors; and classify each control processor as being one of transmitting the message or not transmitting the message based on the program trace signal.

In some embodiments, the monitoring processor can be operable to generate an anomaly notification in response to at least one of: having classified the purported transmitter of the message as not transmitting the message; or having classified a control processor of the plurality of control processors as transmitting the message and not having been identified as the purported transmitter of the message.

In some embodiments, the monitoring processor being operable to analyze the program trace signal of the at least one purported control processor relative to the communication can include the monitoring processor being operable to analyze the program trace signal of the purported transmitter of the message during the communication.

In some embodiments, the at least one purported control processor can include an intended recipient of the message; and the monitoring processor can be operable to verify the intended recipient of the message.

In some embodiments, the monitoring processor can be operable to analyze the program trace signal of each control processor of the plurality of control processors; and classify each control processor as being one of processing the message or not processing the message based on the program trace signal.

In some embodiments, the monitoring processor can be operable to generate an anomaly notification in response to at least one of: having classified the intended recipient of the message as not processing the message; or having classified a control processor of the plurality of control processors as processing the message and not having been identified as the intended recipient of the message.

In some embodiments, the message can include a command for the intended recipient of the message.

In some embodiments, verifying the intended recipient of the message can include verifying execution of the command.

In some embodiments, classifying each control processor as being one of processing the message or not processing the message based on the program trace signal can include classifying each control processor as being one of executing the command or not executing the command based on the program trace signal.

In some embodiments, the monitoring processor can be operable to generate an anomaly notification in response to at least one of: having classified the intended recipient of the message as not executing the command; or having classified a control processor of the plurality of control processors as executing the command and not having been identified as the intended recipient of the message.

In some embodiments, the monitoring processor being operable to analyze the program trace signal of the at least one purported control processor relative to the communication can include the monitoring processor being operable to analyze the program trace signal of the intended recipient of the message following the communication.

In some embodiments, the system can further include a computer memory for storing a plurality of expected program trace samples; and the monitoring processor can be operable to compare the program trace signal of the at least one purported control processor to an expected program trace sample.

In some embodiments, the system can further include a machine learning classifier trained to determine at least one purported control processor from a message; and the monitoring processor can be operable to apply the machine learning classifier to identify the at least one purported control processor from the message detected on the local network.

In some embodiments, the system can further include a machine learning classifier trained to determine at least one expected program trace sample from a program trace signal; and the monitoring processor can be operable to apply the machine learning classifier to identify the at least one expected program trace sample from the program trace signal of the at least one purported control processor.

In some embodiments, the monitoring processor being operable to analyze the program trace signal of the at least one purported control processor can include the monitoring processor being operable to analyze at least one of contiguous or overlapping segments of the program trace signal of the at least one purported control processor.

In some embodiments, lengths of the segments of the program trace signal of the at least one purported control processor can be variable.

In some embodiments, lengths of the segments of the program trace signal of the at least one purported control processor can be based on at least one of a content of the message, a configuration of the monitoring processor, a minimum time for non-empty messages, or a maximum time for messages.

In some embodiments, the local network can include a controller area network.

In accordance with an embodiment, there is provided a method for monitoring a local network. The method involves generating a program trace signal from at least one of power consumption, electromagnetic emission, or acoustic emanation of a control processor connected to the local network; and operating a monitoring processor to detect a communication of a message on the local network; identify at least one purported control processor related to the communication; analyze the program trace signal of the at least one purported control processor relative to the communication; and at least one of an authenticate or verify one or more purported control processors of the at least one purported control processor based on the program trace signal of the at least one purported control processor.

In some embodiments, the at least one purported control processor can include a purported transmitter of the message; and the method can involve operating the monitoring processor to authenticate the purported transmitter of the message.

In some embodiments, the method can involve operating the monitoring processor to analyze the program trace signal of each control processor of a plurality of control processors on the local network; and classify each control processor as being one of transmitting the message or not transmitting the message based on the program trace signal.

In some embodiments, the method can involve operating the monitoring processor to generate an anomaly notification in response to at least one of: having classified the purported transmitter of the message as not transmitting the message; or having classified a control processor of the plurality of control processors as transmitting the message and not having been identified as the purported transmitter of the message.

In some embodiments, operating the monitoring processor to analyze the program trace signal of the at least one purported control processor relative to the communication can involve operating the monitoring processor to analyze the program trace signal of the purported transmitter of the message during the communication.

In some embodiments, the at least one purported control processor can include an intended recipient of the message; and the method can involve operating the monitoring processor to verify the intended recipient of the message.

In some embodiments, the method can involve operating the monitoring processor to analyze the program trace signal of each control processor of the plurality of control processors; and classify each control processor as being one of processing the message or not processing the message based on the program trace signal.

In some embodiments, the method can involve operating the monitoring processor to generate an anomaly notification in response to at least one of: having classified the intended recipient of the message as not processing the message; or having classified a control processor of the plurality of control processors as processing the message and not having been identified as the intended recipient of the message.

In some embodiments, the message can include a command for the intended recipient of the message.

In some embodiments, verifying the intended recipient of the message can involve verifying execution of the command.

In some embodiments, classifying each control processor as being one of processing the message or not processing the message based on the program trace signal can involve classifying each control processor as being one of executing the command or not executing the command based on the program trace signal.

In some embodiments, the method can involve operating the monitoring processor to generate an anomaly notification in response to at least one of: having classified the intended recipient of the message as not executing the command; or having classified a control processor of the plurality of control processors as executing the command and not having been identified as the intended recipient of the message.

In some embodiments, operating the monitoring processor to analyze the program trace signal of the at least one purported control processor relative to the communication can involve operating the monitoring processor to analyze the program trace signal of the intended recipient of the message following the communication.

In some embodiments, the method can involve storing a plurality of expected program trace samples; and operating the monitoring processor to compare the program trace signal of the at least one purported control processor to an expected program trace sample.

In some embodiments, the method can involve training a machine learning classifier to determine at least one purported control processor from a message; and applying the machine learning classifier to identify the at least one purported control processor from the message detected on the local network.

In some embodiments, the method can involve training a machine learning classifier to determine at least one expected program trace sample from a program trace signal; and applying the machine learning classifier to identify the at least one expected program trace sample from the program trace signal of the at least one purported control processor.

In some embodiments, operating the monitoring processor to analyze the program trace signal of the at least one purported control processor can involve operating the monitoring processor to analyze contiguous or overlapping segments of the program trace signal of the at least one purported control processor.

In some embodiments, lengths of the segments of the program trace signal of the at least one purported control processor can be variable.

In some embodiments, lengths of the segments of the program trace signal of the at least one purported control processor can be based on at least one of a content of the message, a configuration of the monitoring processor, a minimum time for non-empty messages, or a maximum time for messages.

In some embodiments, the local network can include a controller area network.

BRIEF DESCRIPTIONS OF THE DRAWINGS

For a better understanding of the embodiments described herein and to show more clearly how they may be carried into effect, reference will now be made, by way of example only, to the accompanying drawings which show at least one exemplary embodiment, and in which.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

The various embodiments described herein generally relate to methods (and associated systems configured to implement the methods) for side-channel monitoring of processing units connected to a local network.

In the automotive field, processing units such as electronic control units (ECUs) are connected to a local network such as a CAN bus. Each ECU typically controls one or more electrical systems in the vehicle, such as but not limited to the engine, power train, transmission, brakes, and suspension.

The local network can be monitored in order to authenticate processing units that send (i.e., transmit) messages and/or verify processing units that receive messages on the local network. More specifically, given an ongoing or past communication, the local network can be monitored in order to determine as early as possible whether the communication is actually sent by the purported sender (i.e., by the sender identified in the transmitted data), and/or determine whether the intended recipient of the message correctly processed the message (i.e., whether the intended recipient reacted to the transmitted message in the usual/normal way).

Side-channel monitoring involves capturing involuntary emissions (i.e., side-channels) of the processing units connected to the local network, such as power consumption, electromagnetic (EM) emissions, and acoustic emanations. Power consumption, EM emission measurements, and acoustic emanation measurements as a function of time can be referred to as power traces, EM emissions traces, or acoustic traces.

Monitoring side-channels of an embedded computing system as it executes a program allows for non-intrusive program tracing, or more generally, capturing program traces. The program traces can be correlated to program code executed by the embedded computing system or observed behavior of the embedded computing system during the program trace, in order to determine the sequence of executed instructions that the embedded computing system executed.

In at least one embodiment, a plurality of embedded computing systems can be connected to a local network to communicate with one another via the local network. A first embedded computing system connected to the local network can transmit a message over the local network. A second embedded computing system connected to the local network can receive the message from the local network. Program traces captured from the first and second embedded computing systems during the time of the communication can indicate that the first embedded computing system transmitted the message and the second embedded computing system did not transmit the message, respectively. Likewise, program traces captured from the first and second embedded computing systems in the time following the communication can indicate that the first embedded computing system did not process the message and the second embedded computing system processed the message, respectively.

For example, in the automotive field, a plurality of ECUs are connected to a CAN bus. Program traces can be obtained from each of the ECUs connected to the CAN bus to determine whether a particular ECU sent a message, thus authenticating the sender of the message. Similarly, the program traces can be used to determine whether a particular ECU processed the message, thus verifying the recipient of the message. The program trace of the recipient can also be used to verify the execution of instructions of the message.

Figure 1:
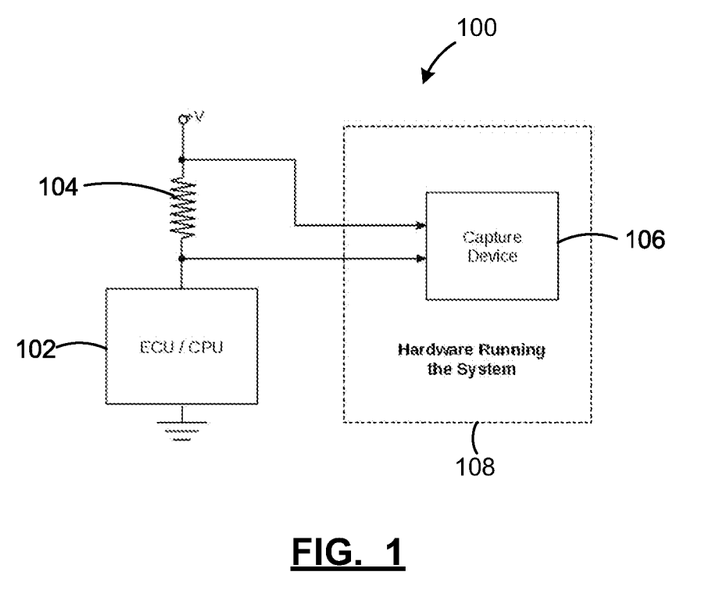
FIG. 1 depicts a power-tracing detector for an embedded computing system, in accordance with at least one embodiment.

Referring to FIG. 1, shown therein is a diagram of a detector 100 for obtaining a power consumption program trace of an embedded computing system, that is, a control processor 102, in accordance with at least one embodiment. Although the control processor 102 is shown as being an ECU/CPU, any embedded computing system can be monitored by the detector 100. In at least one embodiment, the embedded computing system can be a microprocessor, memory chips, or interface circuits.

As shown in FIG. 1, the detector includes a resistor 104 and a capture device 106. The resistor 104 can be placed in series with the power input line of the control processor 102. An analog signal indicative of the power consumption of the control processor 102, or the program trace, can be obtained by measuring current or voltage across the resistor 104.

The capture device 106 can measure current across the resistor 104 in order to obtain the program trace. In addition, the capture device 106 can digitize the program trace. In at least one embodiment, the capture device 106 can be a contactless current sensor. In at least one embodiment, the capture device 106 can include an analog-to-digital converter. In at least one embodiment, the capture device 106 can be a sound card, oscilloscope, or a digital oscilloscope. The program trace obtained by capture device 106 can be used by the monitoring system 108 for authenticating the control processor 102 as being a transmitter or verifying the control processor 102 as being a recipient.

Figure 2:
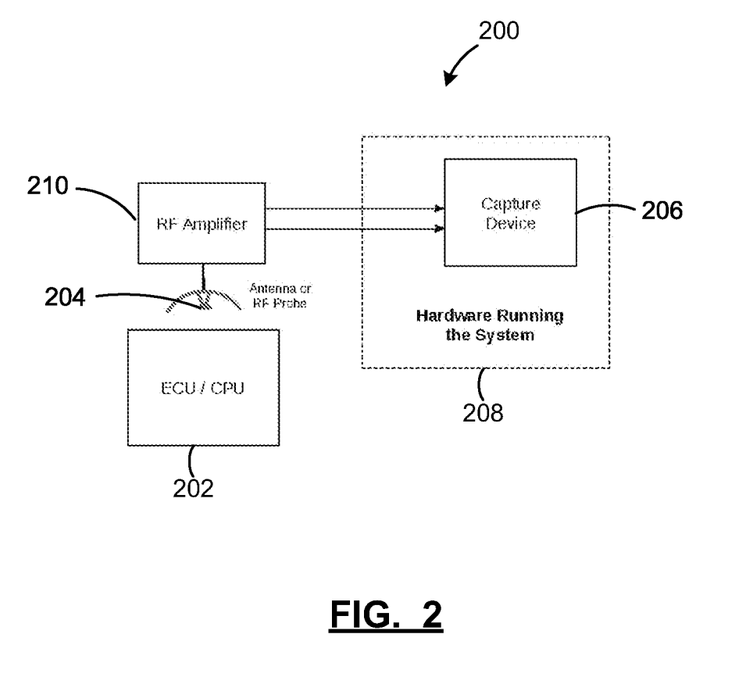
FIG. 2 depicts an electromagnetic emissions tracing detector for an embedded computing system, in accordance with at least one embodiment.

Referring to FIG. 2, shown therein is a diagram of a detector 200 for obtaining an electromagnetic emissions program trace of an embedded computing system, that is, a control processor 202, in accordance with at least one embodiment. Although the control processor 202 is shown as being an ECU/CPU, any embedded computing system can be monitored by the detector 200. In at least one embodiment, the embedded computing system can be a microprocessor, memory chips, or interface circuits.

As shown in FIG. 2, the detector includes a radiofrequency (RF) probe, or antenna 204, an RF amplifier 210, and a capture device 206. The antenna 204 can be placed in the vicinity of the control processor 202 to detect electromagnetic emissions of the control processor 202. In some embodiments, additional signal conditioning is required in order to provide a signal within the operating range of the capture device 206. In some embodiments, the antenna 204 can be cascaded with an RF amplifier 210 to increase the strength of the signal from the antenna 204.

The capture device 206 can measure the output voltage across the antenna 204 in order to obtain the program trace. In addition, the capture device 206 can digitize the program trace. In at least one embodiment, the capture device 206 can be a contactless current sensor. In at least one embodiment, the capture device 206 can include an analog-to-digital converter. In at least one embodiment, the capture device 206 can be a sound card, oscilloscope, or a digital oscilloscope. The program trace obtained by capture device 206 is used by the monitoring system 208 for authenticating the control processor 202 as being a transmitter or verifying the control processor 202 as being a recipient.

Figure 3:
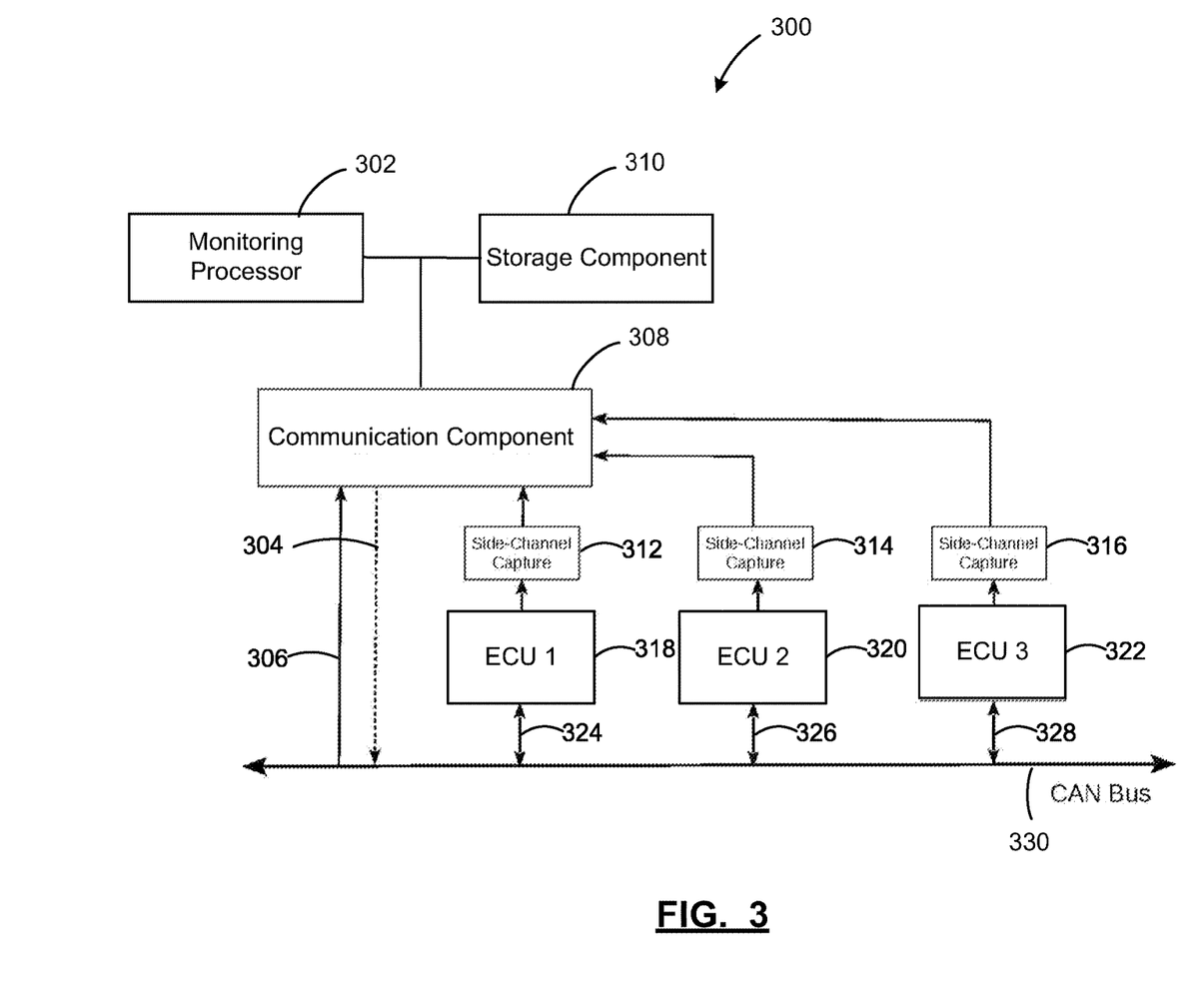
FIG. 3 depicts a system for side-channel monitoring of a local network, in accordance with at least one embodiment.

Referring to FIG. 3, shown therein is a diagram of a system 300 for side-channel monitoring of a local network 330, in accordance with at least one embodiment. The system 300 includes a monitoring processor 302, a communication component 308, a storage component 310, and detectors 312, 314, 316. In some embodiments, each of the processor 302, the storage component and the communication component may be combined into a fewer number of components or may be separated into further components.

The monitoring processor 302 may be any suitable processors, controllers, digital signal processors, graphics processing units, application specific integrated circuits (ASICs), and/or field programmable gate arrays (FPGAs) that can provide sufficient processing power depending on the configuration, purposes and requirements of the monitoring system 302. In some embodiments, the monitoring processor 302 can include more than one processor with each processor being configured to perform different dedicated tasks.

The monitoring processor 302 may be configured to control the operation of the monitoring system 300. The monitoring processor 302 can include modules that initiate and manage the operations of the monitoring system 300. The monitoring processor 302 may also determine, based on received data, stored data and/or user preferences, how the monitoring system 300 may generally operate.

The communication component 308 may be any interface that enables the monitoring system 300 to communicate with other devices and systems. In some embodiments, the communication component 308 can include at least one of a serial port, a parallel port or a USB port. The communication component 308 may also include at least one of a CAN bus, an Internet, Local Area Network (LAN), Ethernet, Firewire, modem, fiber, or digital subscriber line connection. Various combinations of these elements may be incorporated within the communication component 308.

For example, the communication component 308 may receive input from various input devices, such as a mouse, a keyboard, a touch screen, a thumbwheel, a track-pad, a track-ball, a card-reader, voice recognition software and the like depending on the requirements and implementation of the monitoring system.

The storage component 310 can include RAM, ROM, one or more hard drives, one or more flash drives or some other suitable data storage elements such as disk drives, etc. The storage component 310 is used to store an operating system and programs, for example. For instance, the operating system provides various basic operational processes for the monitoring processor 302. The programs include various user programs so that a user can interact with the processor to perform various functions such as, but not limited to, retrieving expected program trace samples as the case may be.

In some embodiments, the storage component 310 can store the program trace signals, information related to the program trace signals, messages, and information related to the messages. The storage component 310 may include one or more databases (not shown) for storing expected program trace samples, information related to the control processors 318, 320, and 322, and information related to the detectors 312, 314, 316.

When transmitting a message, the input and output activity in the processor will cause a distinct pattern in the power consumption and other side-channels such as electromagnetic emissions. By looking at the identification data of the message, it can be determined which is the purported transmitting processor; looking at the power consumption (or other side-channels) pattern for the purported transmitting processor, it can be determined whether the sender is authentic (i.e., whether the purported transmitter is indeed the actual ECU that is transmitting). Similarly, for the receiving processor, in the period of time immediately following the communication of the message, the legitimate recipient should exhibit a pattern in power consumption or other side-channels consistent with the normal reaction (execution) to the received command data of the message.

In this example, the monitoring system 300 monitors three control processors 318, 320, and 322, all of which are connected 324, 326, and 328 to a local network 330. The monitoring system 300 is connected 304, 306 to the local network 330 as well. Although the control processors 318, 320, and 322 are shown as being ECUs, any embedded computing system can be monitored by the monitoring system 300. In at least one embodiment, the control processors 318, 320, and 322 can be a microprocessor, memory chips, or interface circuits. Furthermore, only three control processors 318, 320, and 322 are shown in FIG. 3, however the system can monitor any number of control processors. In addition, although a CAN bus is shown as being the local network 330, other local networks are possible.

The detectors 312, 314, 316 obtain program traces of the control processors 318, 320, and 322 connected to the local network 330. The system 300 includes detectors 312, 314, 316 for each of the control processors 318, 320, and 322. That is, each detector 312, 314, 316 includes a single probe to capture a single program trace, similar to detectors 100 and 200. However, in some embodiments, a detector can include multiple probes to capture multiple program traces from multiple control processors.

Furthermore, any combination of types of detectors 312, 314, 316 can be used in a system to capture multiple program traces. For example, detector 312 can capture a power program trace, while detector 314 can capture an EM program trace, while detector 316 can capture an acoustic program trace.

The detectors 100, 200, and 300 can include additional processing such as, but not limited to digital signal processing, statistical signal processing, statistical pattern recognition, correlation analysis, mutual information analysis, system identification, etc.

Side-channel monitoring is generally not vulnerable to profile-and-mimic attacks because it is based on physical characteristics correlated to the processor's activity, which is independent and physically inaccessible to attackers. The actual power consumption that results from transmitting a message can generally only occur when transmitting a message. Another processor transmitting a message cannot readily change this. Thus, a remote attacker without physical access to the local network 330 that compromises a processor 318, 320, and 322 on the local network 330 cannot generally achieve a profile-and-mimic attack. For an attacker with physical access to the local network 330 (i.e., a processor 318, 320, and 322 on the local network 330), side-channel monitoring may still detect the attack.

Side-channel monitoring may also be used to mitigate spoofing attacks. An example of a spoofing attack is a processor 318, 320, and 322 on the local network 330 that is compromised. Another example of a spoofing attach is an "alien" device on the local network 330 transmitting messages with identification data corresponding to a different device that the "alien" device is impersonating. Side-channel monitoring may also be used to identify hidden functionality in other processors 318, 320, and 322. If a device other than the intended recipient exhibits a highly unusual pattern in reaction to the received command, it may be an indication that that processor 318, 320, and 322 has been compromised and has some hidden/unintended functionality. For example, the compromised processor could be analyzing traffic on the local network 330 and collecting data in preparation to execute a future attack.

Side-channel monitoring may also be used to identify active attacks that are disrupting a processor's 318, 320, and 322 ability to transmit, or generally disrupt communications on the local network 330. For example, side-channel monitoring can identify an anomalous condition in which the local network 330 shows no communications but the power consumption pattern corresponding to a transmitting processor 318, 320, and 322 is observed. When an anomalous condition is detected, the system can issue a notification of the anomaly on the local network 330 to inform other processors 318, 320, and 322.

Figure 4:
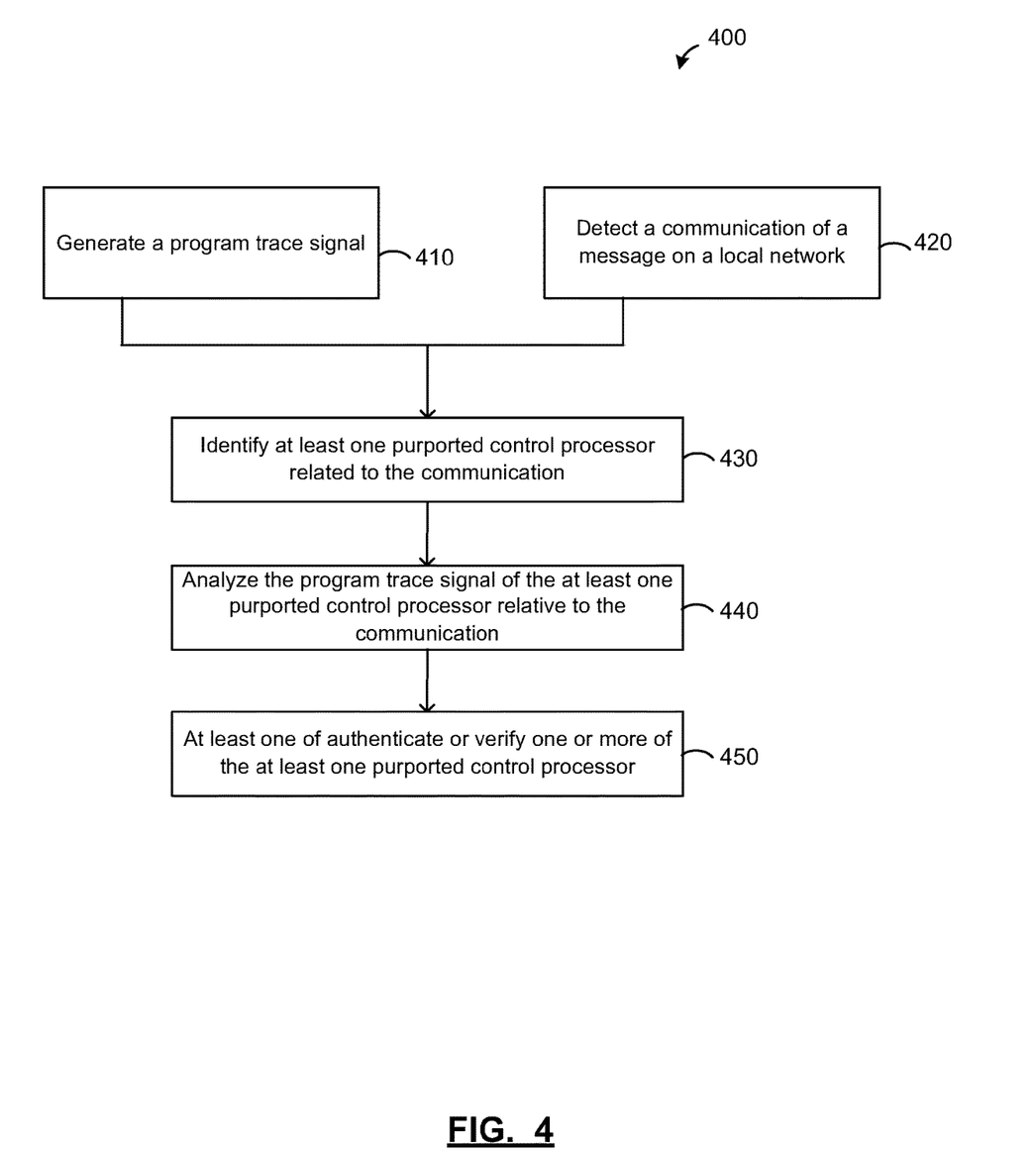
FIG. 4 depicts a flowchart of a method for side-channel monitoring of a local network, in accordance with at least one embodiment.

Referring now to FIG. 4, an example method 400 of monitoring a local network is shown in a flowchart diagram. To assist with the description of the method 400, reference will be made simultaneously to FIG. 1 to FIG. 3.

At 410, a detector, such as example detectors 106, 206, 312, 314, and 316, generates a program trace signal. The program trace signal can be obtained from a control processor connected to the local network 330, such as example electronic control units 102, 202, 318, 320, and 322. In some embodiments, the program trace signal can be derived from the power consumption of the control processor 102, such as that obtained by detector 100 via the resistor 104. In some embodiments, the program trace signal can be derived from electromagnetic emissions of the control processor 202, such as that obtained by detector 206 via radio frequency probe 204 and radio frequency amplifier 210. In some embodiments, the program trace signal can be derived from acoustic emanations of the control processor. In some embodiments, the local network can include a controller area network, such as example CAN bus 330.

At 420, a monitoring processor 302 is operated to detect a communication of a message on the local network. A plurality of control processors 318, 320, and 322 can be connected to the local network 330 and transmit messages from one another over the local network 330. The messages transmitted over the local network 330 can include information about the source of the message, that is, a purported transmitter of the message and information about the destination of the message, that is, an intended recipient of the message.

It should be noted that FIG. 4 illustrates the generation of the program trace at 410 occurring concurrently as the detection of a communication of a message on the local network 330 at 420. However, in some embodiments, the generation of the program trace at 410 can occur continuously while detection of a communication of a message on the local network 330 at 420 can be a discrete occurrence.

At 430, the monitoring processor 302 is operated to identify at least one purported control processor related to the communication. The at least one purported control processor can be determined from the message. In some embodiments, the at least one purported control processor can include a purported transmitter of the message. In some embodiments, the at least one purported control processor can include an intended recipient of the message. In some embodiments, the message can include identification data about the at least one purported control processor.

In at least one embodiment, the monitoring processor 302 can be operated to determine the at least one purported control processor from the message based on machine learning techniques. In some embodiments, the system 300 can include a supervised learning engine or a machine learning classifier trained to determine a purported transmitter and/or an intended recipient of a message communicated on the local network 330. Training of the machine learning classifier can, for example, involve observing communication on the local network 330 and learning the typical pattern of side-channel information following the communication. After the machine learning classifier learns the typical patterns, the monitoring processor 302 can be operated to apply the classifier to messages observed on the local network 330 and determine purported transmitters of the messages observed and intended recipients of the messages observed.

At 440, the monitoring processor 302 is operated to analyze the program trace signal of the purported control processor relative to the communication. That is, the monitoring processor 302 is operated to analyze an actual program trace signal obtained at 410.

In some embodiments, the monitoring processor 302 can be operated to analyze the program trace signal of the purported transmitter of the message during the communication. That is, the monitoring processor 302 can analyze the program trace signal of the purported transmitter of the message as the purported transmitter is transmitting the message.

In some embodiments, the monitoring processor 302 can be operated to analyze the program trace signal of each control processor of the plurality of control processors 318, 320, and 322 on the local network 330 during the communication; and classify each control processor as being one of transmitting the message or not transmitting the message based on the program trace signal of that control processor.

In some embodiments, the monitoring processor 302 can be operated to analyze the program trace signal of the intended recipient of the message following the communication. That is, the monitoring processor 302 can analyze the program trace signal of the intended recipient of the message as the intended recipient of the message is processing the message (i.e., responding in a significant way to the message).

In some embodiments, the monitoring processor 302 can be operated to analyze the program trace signal of each control processor of the plurality of control processors 318, 320, and 322 on the local network 330 following the communication; and classify each control processor as being one of processing the message or not processing the message based on the program trace signal of that control processor.

In some embodiments, verification of the intended recipient can involve verifying the response of the intended recipient to the message. For example, the message can include a command for the intended recipient or include data that the intended recipient acts on. The monitoring processor 302 can verify the command execution by the intended recipient. The monitoring processor 302 can analyze the program trace signal of the intended recipient of the message as the intended recipient of the message is executing the command included in the message or action based on the message.

In some embodiments, the monitoring processor 302 can be operated to analyze the program trace signal of each control processor of the plurality of control processors 318, 320, and 322 on the local network 330 following the communication; and classify each control processor as being one of executing commands or not executing commands based on the program trace signal of that control processor.

In some embodiments, the monitoring processor 302 can be operated to analyze both the program trace signal of the purported transmitter of the message during the communication and the program trace signal of the intended recipient of the message following the communication.

In some embodiments, the monitoring processor 302 being operable to analyze the program trace signal of the purported control processor relative to the communication can involve comparing the actual program trace signal of the at least one purported control processor to an expected program trace sample. For example, expected program trace samples can relate to execution of various program code such as but not limited to actions such as transmitting a message, processing a message, and other commands or actions that may be executed in response to a message. In some embodiments, the monitoring processor 302 can determine the command included in the message or action based on the message.

If the actual program trace signal of the purported control processor is substantially similar to the expected program trace sample stored in a computer memory 310, the monitoring processor 302 can classify the purported control processor accordingly.

That is, if the actual program trace signal of the purported control processor is substantially similar to the expected program trace sample of the purported control processor when the purported control processor is executing program code such as but not limited to transmitting, processing, or executing a particular command, the monitoring processor 302 can classify the purported control processor as having been transmitting, processing, or executing that particular command respectively. If the actual program trace signal of the purported control processor is not substantially similar to the expected program trace sample of the purported control processor when the purported control processor is executing program code such as but not limited to transmitting, processing, or executing a particular command, the monitoring processor 302 can classify the purported control processor as not having been transmitting, processing, or executing that particular command respectively.

In some embodiments, analyzing the program trace signal of the purported control processor relative to the communication can involve machine learning techniques. In some embodiments, the system 300 can include a supervised learning engine or machine learning classifier trained to recognize expected program trace samples. As noted above, expected program trace samples can relate to execution of various program code such as but not limited to transmitting a message, processing a message, and other commands or actions that may be executed in response to a message. The machine learning classifier can be configured to have multiple models or training database, depending on the intended recipient and the command.

The machine learning classifier can, for example, observe communication on the local network and learn the typical program trace signals during and following the communication. After the classifier learns the typical program trace signals during and following the communication, the system 300 can be operated to apply the classifier to recognize an expected program trace sample (i.e., the typical program trace signal) from the actual program trace signal of the purported control processor. If the expected program trace sample is recognized from the actual program trace signal of the purported control processor, the monitoring processor 302 can classify the purported control processor accordingly. That is, if the expected program trace sample is recognized from the actual program trace signal of the purported control processor when the purported control processor is executing program code such as but not limited to transmitting, processing, or other command execution, the monitoring processor 302 can classify the purported control processor as having been transmitting, processing, or executing that particular command respectively. If the expected program trace sample is not recognized from the actual program trace signal of the purported control processor when the purported control processor is executing program code such as but not limited to transmitting, processing, or executing a particular command, the monitoring processor 302 can classify the purported control processor as not having been transmitting, processing, or executing that particular command respectively.

In some embodiments, the monitoring processor 302 being operable to analyze the program trace signal of the purported control processor relative to the communication can involve comparing the actual program trace signal of the at least one purported control processor to an expected program trace sample stored in a computer memory 310 and using machine learning techniques.

The segments of the program trace signal extracted for analysis can be contiguous or overlapping segments of the program trace signal. In some embodiments, the lengths of the segments of the program trace signal of the at least one purported control processor can vary. In some embodiments, the length of the segment can be configured based on the monitoring processor 302 or the control processor 318, 320, and 322, such as hardware specification and a desired system performance.

In some embodiments, the length of the segment can be based on the content of the message, such as the command included in the message or action based on the message. The command included in the message can be part of normal operations for the system 300, or the command can be in support of monitoring of the system 300. The system 300 can transmit a message or a sequence of messages in any suitable way to allow the system 300 to assess the integrity of a given control processor, in an on-demand manner. In some embodiments, the length of the segment can depend on a minimum time for transmitting non-empty messages, which can, in turn depend on a minimum length of a non-empty message. The length of the segment can also can depend on a maximum time of transmitting messages, which can, in turn depend on a maximum length of a message.

At 450, the monitoring processor 302 is operated to at least one of authenticate or verify the purported control processor. In some embodiments, the monitoring processor 302 can operate to authenticate the purported transmitter of the message identified at 430. In some embodiments, the monitoring processor 302 can operate to verify the intended recipient of the message identified at 430. In some embodiments, the monitoring processor 302 can operate to verify command execution by the intended recipient of the message identified at 430. In some embodiments, the monitoring processor 302 can operate to authenticate the purported transmitter, verify the intended recipient, and/or verify the command execution by the intended recipient of the message identified at 430.

In the event that the control processor of the purported transmitter of the message is classified as having been transmitting during the communication, the monitoring processor 302 can authenticate the purported transmitter of the message. In the event that the control processor of the purported transmitter of the message is classified as not having been transmitting during the communication, the monitoring processor 302 may not authenticate the purported transmitter of the message. In some embodiments, the monitoring processor 302 can generate an anomaly notification indicating that the purported transmitter of the message could not be authenticated.

In the event that one or more control processors of the plurality of control processors 318, 320, and 322 is classified as having been transmitting during the communication and that control processor was not identified as the purported transmitter of the message, the monitoring processor 302 can generate an anomaly notification. That is, the system 300 can detect when an "imposter" control processor that is not the purported transmitter has transmitted a message.

In the event that none of the control processors of the plurality of control processors 318, 320, and 322 is classified as having been transmitting during the communication, the monitoring processor 302 can generate an anomaly notification. That is, the system 300 can detect when an "alien" control processor has transmitted a message.

In the event that the control processor of the intended recipient of the message is classified as having been processing following the communication, the monitoring processor 302 can verify the intended recipient of the message. In the event that the control processor of the intended recipient of the message is classified as not having been processing following the communication, the monitoring processor 302 may not verify the intended recipient of the message. In some embodiments, the monitoring processor 302 can generate an anomaly notification indicating that the intended recipient of the message could not be verified.

In the event that one or more control processors of the plurality of control processors 318, 320, and 322 is classified as having been processing following the communication and that control processor was not identified as the intended recipient of the message, the monitoring processor 302 can generate an anomaly notification. That is, the system 300 can detect when a control processor that is not the intended recipient has processed the message (i.e., control processor compromised and has hidden or unintended functionality).

In the event that the control processor of the intended recipient of the message is classified as having been executing commands following the communication, the monitoring processor 302 can verify the command execution by the intended recipient of the message. In the event that the control processor of the intended recipient of the message is classified as not having been executing commands following the communication, the monitoring processor 302 may not verify the command execution by the intended recipient. In some embodiments, the monitoring processor 302 can generate an anomaly notification indicating that the execution of commands by the intended recipient of the message could not be verified.

In the event that one or more control processors of the plurality of control processors 318, 320, and 322 is classified as having been executing commands following the communication and that control processor was not identified as the intended recipient of the message, the monitoring processor 302 can generate an anomaly notification. That is, the system 300 can detect when a control processor that is not the intended recipient has executed commands included in the message or actions based on the message (i.e., control processor compromised and has hidden or unintended functionality).

In addition to generating anomaly notifications, the monitoring processor 302 and/or the control processors 318, 320, and 322 can take preventive action(s), depending on the type of anomalous condition. Such preventative action can depend on the application. For example, when a purported transmitter of a message cannot be authenticated, the intended recipient can, in response to the notification of an anomalous condition, ignore or disregard the message.

In some embodiments, the monitoring processor 302 can continuously monitor the local network 330, even in the absence of detecting communication on the local network 330 to detect anomalous conditions. For example, during the times when communications are not detected at 420, the monitoring processor 302 can extract segments, possibly contiguous or overlapping segments, of the program trace signal for each control processor of the plurality of control processors 318, 320, 322. The monitoring processor 302 can analyze the program trace signal of each control processor and determine whether it can be classified as executing program code such as transmitting, processing, or other command execution. If the system determines that the actual program trace signal can be classified as executing program code such as transmitting, processing, or other command execution, the monitoring processor 302 can generate an anomaly notification. That is, the system 300 can detect when a control processor has hidden or unintended functionality.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A system for monitoring a local network having a plurality of device processors connected thereto, the system comprising:
   a. at least one detector operable to generate a program trace signal from at least one side-channel of each device processor of the plurality of device processors;
   b. a communication component to provide access to the local network; and
   c. at least one monitoring processor in communication with the communication component and the at least one detector, the at least one monitoring processor being operable to:
      i. detect a communication of a message on the local network;
      ii. identify a device processor of the plurality of device processors as a purported transmitter of the message;
      iii. analyze the program trace signal of each device processor of the plurality of device processors relative to the communication;
      iv. classify each device processor of the plurality of device processors as being one of transmitting the message or not transmitting the message based on the respective program trace signal; and v. in response to classifying the purported transmitter of the message as transmitting the message, authenticate the purported transmitter of the message.

2. The system of claim 1, wherein the at least one monitoring processor is operable to generate an anomaly notification in response to at least one of:
   a. having classified the purported transmitter of the message as not transmitting the message; or
   b. having classified a device processor of the plurality of device processors as transmitting the message and not having been identified as the purported transmitter of the message.

3. The system of claim 1, wherein
   a. the system further comprises a machine learning classifier trained to determine at least one device processor related to a message from the message; and
   b. the at least one monitoring processor is operable to apply the machine learning classifier to identify the purported transmitter of the message from the message detected on the local network.

4. The system of claim 1, wherein
   a. the system further comprises a machine learning classifier trained to determine at least one expected program trace sample from a program trace signal; and
   b. the at least one monitoring processor is operable to apply the machine learning classifier to identify the at least one expected program trace sample from the program trace signal of the purported transmitter of the message.

5. A system for monitoring a local network having a plurality of device processors connected thereto, the system comprising:
   a. at least one detector operable to generate a program trace signal from at least one side-channel of each device processor of the plurality of device processors;
   b. a communication component to provide access to the local network; and
   c. at least one monitoring processor in communication with the communication component and the at least one detector, the at least one monitoring processor being operable to:
      i. detect a communication of a message on the local network;
      ii. identify at least one device processor as an intended recipient of the message;
      iii. analyze the program trace signal of each device processor of the plurality of device processors relative to the communication;
      iv. classify each device processor of the plurality of device processors as being one of processing the message or not processing the message based on the respective program trace signal; and
      v. in response to classifying the at least one intended recipient of the message as processing the message, verify the at least one intended recipient of the message.

6. The system of claim 5, wherein the at least one monitoring processor is operable to generate an anomaly notification in response to at least one of:
   a. having classified the at least one intended recipient of the message as not processing the message; or
   b. having classified a device processor of the plurality of device processors as processing the message and not having been identified as the at least one intended recipient of the message.

7. The system of claim 5, wherein:
   a. the message comprises a command for the at least one intended recipient of the message; and
   b. the at least one monitoring processor being operable to verify the at least one intended recipient of the message comprises the at least one monitoring processor being operable to verify execution of the command by the at least one intended recipient.

8. The system of claim 7, wherein the at least one monitoring processor being operable to classify each device processor of the plurality of device processors as being one of processing the message or not processing the message based on the respective program trace signal comprises the at least one monitoring processor being operable to classify each device processor of the plurality of device processors as being one of executing the command or not executing the command based on the respective program trace signal.

9. The system of claim 8, wherein the at least one monitoring processor is operable to generate an anomaly notification in response to at least one of:
   a. having classified the at least one intended recipient of the message as not executing the command; or
   b. having classified a device processor of the plurality of device processors as executing the command and not having been identified as the at least one intended recipient of the message.

10. The system of claim 5, wherein
    a. the system further comprises a machine learning classifier trained to determine at least one device processor related to a message from the message; and
    b. the at least one monitoring processor is operable to apply the machine learning classifier to identify the at least one intended recipient of the message from the message detected on the local network.

11. The system of claim 5, wherein
    a. the system further comprises a machine learning classifier trained to determine at least one expected program trace sample from a program trace signal; and
    b. the at least one monitoring processor is operable to apply the machine learning classifier to identify the at least one expected program trace sample from the program trace signal of the at least one intended recipient of the message.

12. A method for monitoring a local network having a plurality of device processors connected thereto, the method comprising:
    a. generating a program trace signal from at least one side-channel of each device processor of the plurality of device processors; and
    b. operating at least one monitoring processor to:
       i. detect a communication of a message on the local network;
       ii. identify a device processor of the plurality of device processors as a purported transmitter of the message;
       iii. analyze the program trace signal of each device processor of the plurality of device processors relative to the communication;
       iv. classify each device processor of the plurality of device processors as being one of transmitting the message or not transmitting the message based on the respective program trace signal; and
       v. in response to classifying the purported transmitter of the message as transmitting the message, authenticate the purported transmitter of the message.

13. The method of claim 12 comprises operating the at least one monitoring processor to generate an anomaly notification in response to at least one of:

a. having classified the purported transmitter of the message as not transmitting the message; or
b. having classified a device processor of the plurality of device processors as transmitting the message and not having been identified as the purported transmitter of the message.

14. The method of claim 12 comprises:
a. training a machine learning classifier to determine at least one device processor related to a message from the message; and
b. applying the machine learning classifier to identify the purported transmitter of the message from the message detected on the local network.

15. The method of claim 12 comprises:
a. training a machine learning classifier to determine at least one expected program trace sample from a program trace signal; and
b. applying the machine learning classifier to identify the at least one expected program trace sample from the program trace signal of the purported transmitter of the message.

16. A method for monitoring a local network having a plurality of device processors connected thereto, the method comprising:
a. generating a program trace signal from at least one side-channel of each device processor of the plurality of device processors; and
b. operating at least one monitoring processor to:
  i. detect a communication of a message on the local network;
  ii. identify at least one device processor as an intended recipient of the message;
  iii. analyze the program trace signal of each device processor of the plurality of device processors relative to the communication;
  iv. classify each device processor of the plurality of device processors as being one of processing the message or not processing the message based on the respective program trace signal; and
  v. in response to classifying the at least one intended recipient of the message as processing the message, verify the at least one intended recipient of the message.

17. The method of claim 16 comprises operating the at least one monitoring processor to generate an anomaly notification in response to at least one of:
a. having classified the at least one intended recipient of the message as not processing the message; or
b. having classified a device processor of the plurality of device processors as processing the message and not having been identified as the at least one intended recipient of the message.

18. The method of claim 16, wherein:
a. the message comprises a command for the at least one intended recipient of the message; and
b. operating the at least one monitoring processor to verify the at least one intended recipient of the message comprises operating the at least one monitoring processor to verify execution of the command by the at least one intended recipient.

19. The method of claim 18, wherein operating the at least one monitoring processor to classify each device processor of the plurality of device processors as being one of processing the message or not processing the message based on the respective program trace signal comprises operating the at least one monitoring processor to classify each device processor of the plurality of device processors as being one of executing the command or not executing the command based on the respective program trace signal.

20. The method of claim 19 comprises operating the at least one monitoring processor to generate an anomaly notification in response to at least one of:
a. having classified the at least one intended recipient of the message as not executing the command; or
b. having classified a device processor of the plurality of device processors as executing the command and not having been identified as the at least one intended recipient of the message.

21. The method of claim 16 comprises:
a. training a machine learning classifier to determine at least one device processor related to a message from the message; and
b. applying the machine learning classifier to identify the at least one intended recipient of the message from the message detected on the local network.

22. The method of claim 16 comprises:
a. training a machine learning classifier to determine at least one expected program trace sample from a program trace signal; and
b. applying the machine learning classifier to identify the at least one expected program trace sample from the program trace signal of the at least one intended recipient of the message.

* * * * *